TELEPHONE SYSTEMS

Filed Oct. 18, 1955 5 Sheets-Sheet 1

Inventor
JOHN LESLIE GALVIN
By
Young, Emery & Thompson
Attorneys

Sept. 9, 1958 J. L. GALVIN 2,851,536

TELEPHONE SYSTEMS

Filed Oct. 18, 1955 5 Sheets-Sheet 2

Inventor
JOHN LESLIE GALVIN
By Young, Emery & Thompson
Attorneys

Sept. 9, 1958

J. L. GALVIN 2,851,536

TELEPHONE SYSTEMS

Filed Oct. 18, 1955

5 Sheets-Sheet 3

Inventor
JOHN LESLIE GALVIN
By Young, Emery & Thompson
Attorneys

Sept. 9, 1958　　J. L. GALVIN　　2,851,536

TELEPHONE SYSTEMS

Filed Oct. 18, 1955　　5 Sheets-Sheet 4

Inventor
JOHN LESLIE GALVIN
By
Young, Emery & Thompson
Attorneys

Sept. 9, 1958 J. L. GALVIN 2,851,536

TELEPHONE SYSTEMS

Filed Oct. 18, 1955 5 Sheets-Sheet 5

Inventor
JOHN LESLIE GALVIN
By Young, Emery & Thompson
Attorneys

United States Patent Office 2,851,536
Patented Sept. 9, 1958

2,851,536

TELEPHONE SYSTEMS

John Leslie Galvin, Liverpool, England, assignor to Automatic Telephone & Electric Company Limited, Liverpool, England, a British company Application October 18, 1955, Serial No. 541,270

Claims priority, application Great Britain November 30, 1954

9 Claims. (Cl. 179—27)

The present invention relates to telephone or like systems employing switching arrangements to give access to trunk operators, and is more particularly concerned with improvements in the arrangements for giving access to these operators during periods of heavy traffic.

In telephone systems of the type employing finders controlled by trunk operators, who assist in the routing of a trunk call, it may happen that in periods of heavy traffic all finders associated with the trunk operators will be in use when further calls requiring operator assistance arrive.

Under these circumstances it is desirable to provide a facility whereby in periods of heavy traffic, calls unable to be answered by an operator are allowed to queue until an operator becomes available. It is an advantage if the common queue control equipment is of simple construction and requires only periodic maintenance checks. It is an added advantage that the queue circuit arrangements are such that they can automatically provide queue positions in excess of a predetermined number of queue positions should the traffic incidence become abnormally heavy.

The object of the invention is to provide a simple and economical arrangement capable of dealing with heavy traffic incidence. A further object is that the equipment shall be capable of dealing with abnormally heavy traffic and also provide queueing positions for this traffic.

According to one feature of the invention, if the trunk demand circuits requiring connection to operators' positions are in excess of the number of queue positions, the excess trunk demand circuits are directed to the last position of the queue and such excess trunk demand circuits are extended to the operators' positions in accordance with their positions in the multiple of automatic switches by which they are accessible from the operators' positions.

According to a further feature of the invention, common equipment is provided to form the trunk demand circuits into a queue, the common equipment including a stepping means which makes one step each time a trunk demand circuit joins the queue, to indicate the next position of the queue and means are provided for preventing further operation of said stepping means when the last queue position is marked so that trunk demand circuits subsequently taken into use are directed to the last queue position.

According to a further feature of the invention, second stepping means are provided which each time a trunk demand circuit is taken out of the queue make one step to mark the trunk demand circuit at the head of the queue, and means are provided to prevent the stepping of the second stepping means from a queue position occupied by more than one trunk demand circuit until all such trunk demand circuits have been dealt with.

According to another feature of the invention, the two stepping means are cyclically operated whereby the last position of the queue circulates around the queue.

Figure 1:
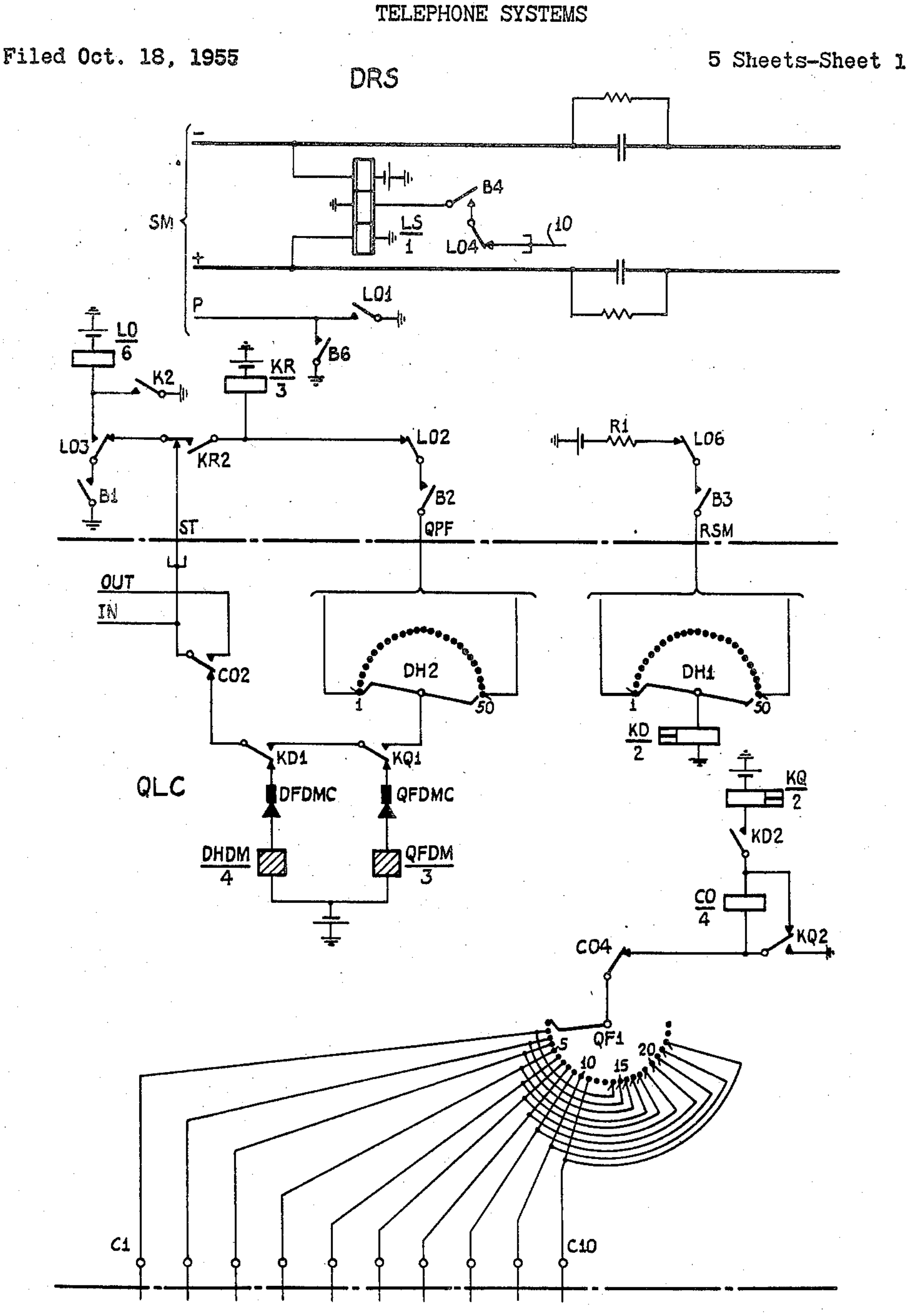
Figure 2:
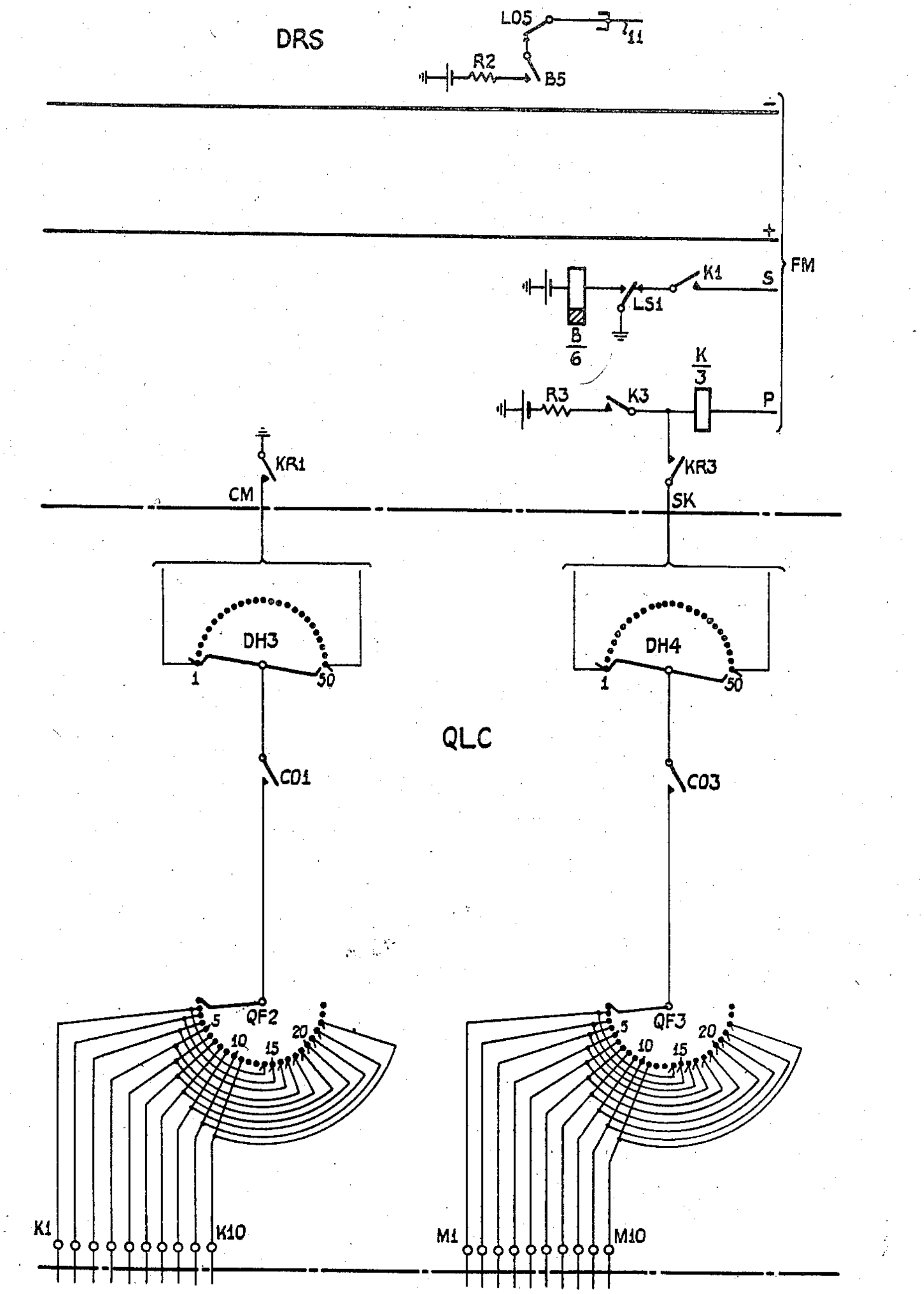
Figures 3, 6:
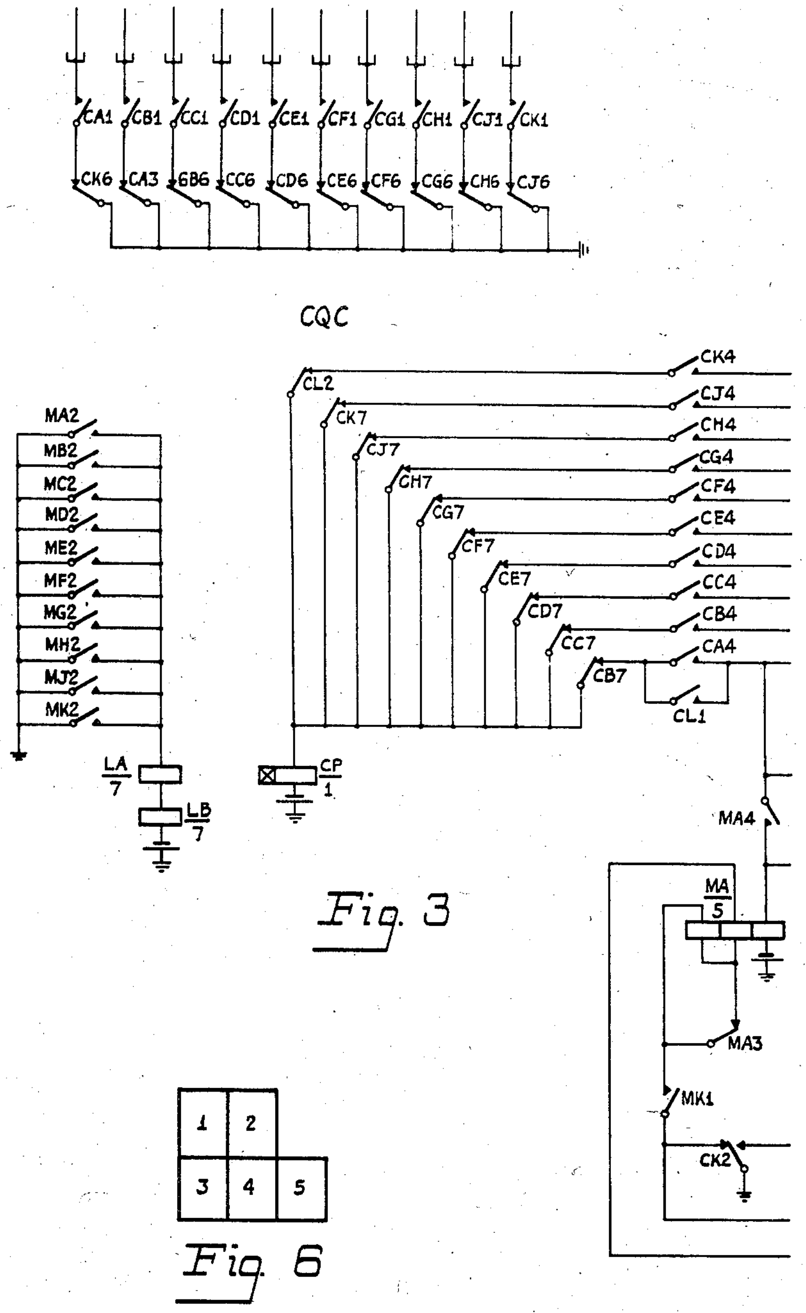
Figure 4:
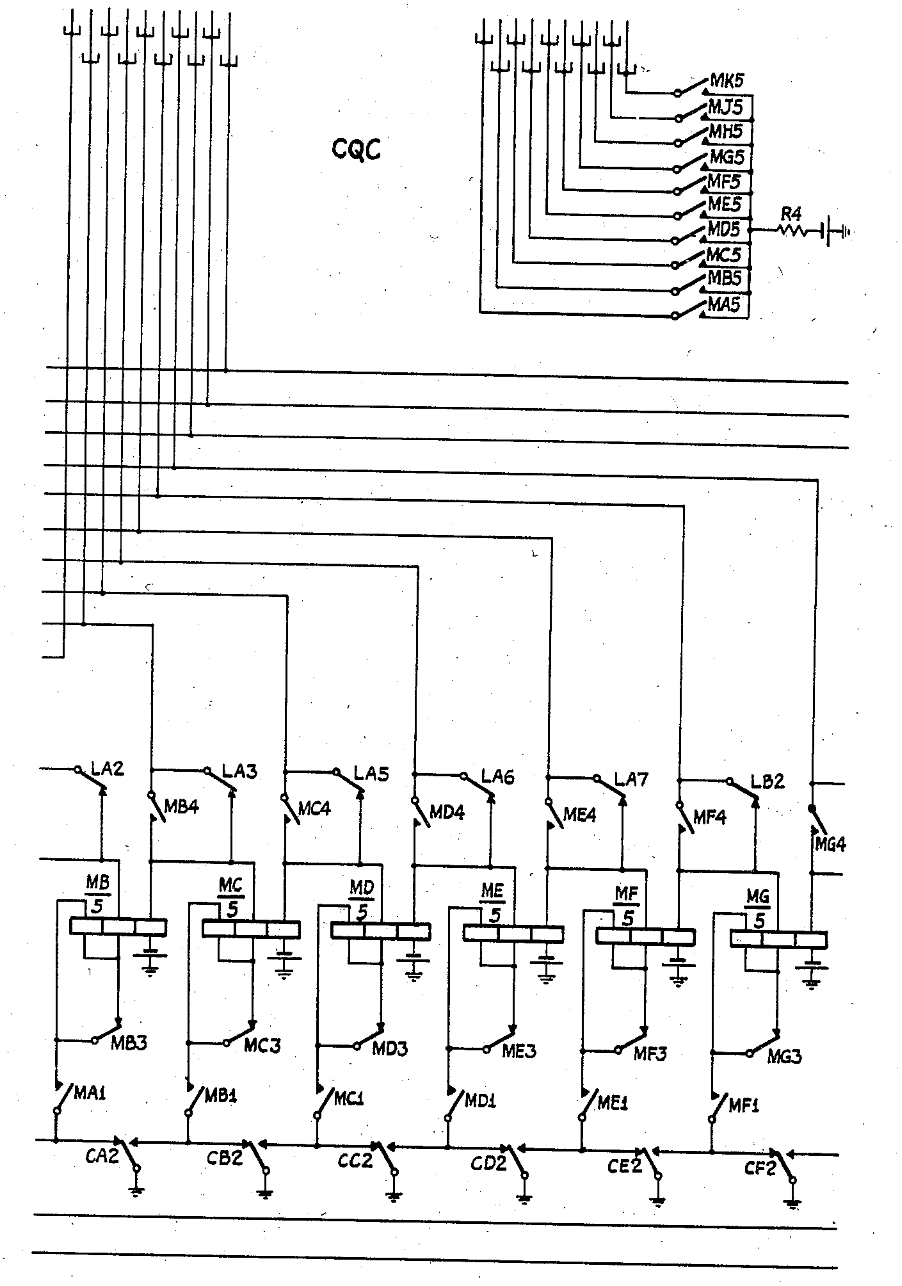
Figure 5:
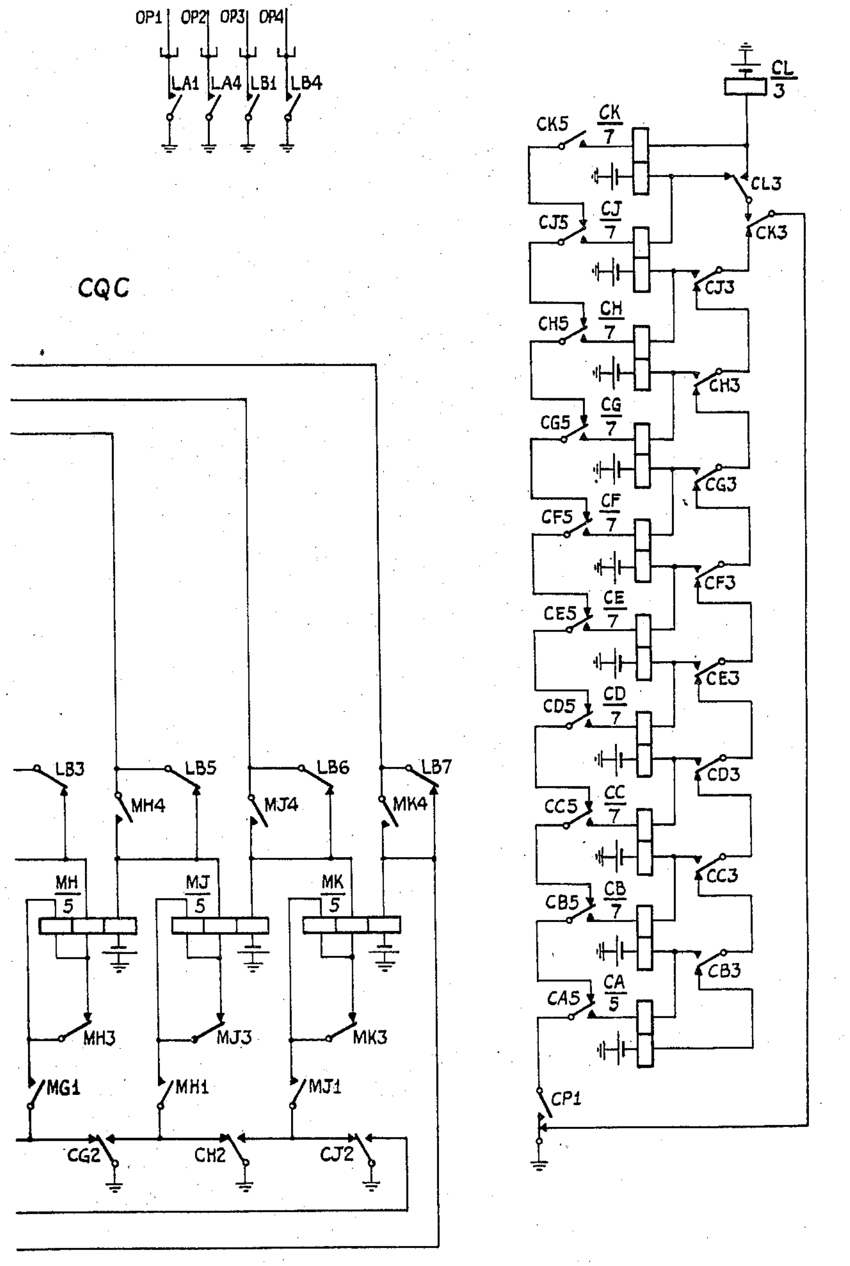

The invention will be better understood from the following description of the method of carrying it into effect taken in conjunction with the accompanying drawings comprising Figs. 1–6, to be arranged in accordance with Fig. 6.

The circuit incorporates a typical demand relay set, a queue link circuit QLC, and the common cyclic queue control CQC. The demand relay set DRS is accessible from the bank multiple SM of preceding selectors (not shown) say first selectors, and also has a position on the bank multiple FM of the finder switches (not shown) which are operator controlled and have say 200 outlets. Thus the finder may have access to 200 demand relay sets.

The 200 demand relay sets are divided into four groups of 50, each of which groups are served by five queue link circuits QLC the 50 demand relay sets in a group being multiplied between the five link circuits. The group of 50 demand relay sets is further divided into five sub-groups of 10, each sub-group being allocated a different one of the five queue link circuits as its normal first choice.

The start leads extending between a sub-group of demand relay sets and the associated five queue link circuits are connected in a chain circuit in such a manner that if a demand relay set of a particular sub-group is using the normal first choice link circuit, a further demand relay set from the same sub-group requiring a link circuit can use, as a second choice, an idle first choice link circuit of another sub-group in that group.

All link circuits of all groups have access to the cyclic queue control CQC. This control performs the dual actions of allocating queue positions to the link circuits and, at appropriate times, allowing these to have access to the first available operator, on a time of arrival basis, up to a predetermined number of queue positions. The control circuit is capable of providing queueing facilities for over ten links circuits, those over ten being directed to the last position, of the queue (10th position) and being allocated, at appropriate times, from this position to an idle operator in an order dependent on the bank position of the demand relay sets in the finder switch multiple FM.

Taking the case of a demand relay set which is taken into use during a period of light traffic incidence, the seizure of the demand relay set DRS causes a start to be forwarded to one of the associated link circuits QLC of that group in which the demand relay set DRS is situated. The link circuit then associates itself with the demand relay set that provided the start, after which it automatically finds a queue position for the demand relay set as indicated by the cyclic queue control CQC. It should be noted that all calls requiring manual assistance must proceed under the direction of the cyclic queue control regardless of the rate of traffic incidence. The link circuit by its association with the cyclic queue control CQC causes suitable indication to be given by CQC to all operators that a call is waiting. Any operator may answer the call by assigning a particular demand finder associated with that operator to search over the finder multiple FM for a marking denoting the calling demand relay set. The finder halts its search on encountering this marking and the call may proceed, the link circuit and cyclic queue control being disconnected and made available for other traffic.

The progress of such a call will now be described in circuit detail.

Prior to any circuit function taking place, relay CA (Fig. 5) of the cyclic queue control will be operated from contacts CP1, through contacts CK3, CJ3, CH3, CF3, CE3, CD3, CC3, CB3, the lower winding of relay CA to battery. Contacts CA1 (Fig. 3) complete a path to indicate the first queue position, in this instance to common lead C1, contacts CA4 prepare a circuit to operate relay CP from common lead K1, and contacts CA5 prepare a series holding path for relays CA and CB.

The demand relay set is found to be idle by the preceding selector due to the absence of the busying potential on the P lead of the selector multiple SM and a loop condition is then applied to the speech wires (−) and (+), resulting in the operation of relay LS, which at contacts LS1 operates relay B.

Relay B operating, at contacts B1 connects earth to the sub-group common start lead ST and assuming the first choice queue link circuit is available, causes its demand hunter DH to search for the indication of the calling demand relay set DRS. Contacts B2 prepare the operate path for relay KR from lead QPF, contacts B3 connect the battery of resistor R1 to lead RSM and the DH1 bank contact to indicate the calling DRS. Contacts B4 complete a path to provide ringing tone to the calling party from common lead 10, contacts B5 complete a path to an unanswered calls indicator (not shown) on common lead 11 and contacts B6 provide busying earth to the P lead of the selector multiple to guard the demand relay set against intrusion.

Earth from contacts B1 through contacts LO3, KR2, common lead ST, contacts CO2, KD1, DHDMC, and the windings of the demand hunter driving magnets DHDM to battery causes the demand hunter DH to self-interrupt and drive over the bank contacts searching for the battery provided by resistor R1 of the demand relay set DRS. When this is encountered, the high speed relay KD operates, and at contacts KD1 changes over the earth at contacts B1 from the demand hunter driving magnets DHDM, to the queue finder driving magnets QFDM. Contacts KD2 prepare a path to operate the high speed relay KQ from the earth on common lead C1 when the queue finder switch steps on to contact two. Relay KQ operating, at contacts KQ1 disconnects the queue finder switch and also completes the circuit to the wiper DH2 to operate relay KR over lead QPF. Contacts KQ2 remove a short circuit from relay CO which relay operates and holds in series with relay KQ.

Relay KR operating, at contacts KR1 connects earth through lead CM to the DH3 bank contact, at contacts KR2 provides an alternative self-hold circuit and at contacts KR3 prepares a path to operate relay K. The operation of relay CO, at contacts CO1 extends earth from the wiper of DH3 over the wiper of QF2 which is on contact two at this time, common lead K1, contacts CA4 and CB7 to operate relay CP and also over contacts LA2 to operate relay MA over its right-hand winding. Contacts CO2 extend the start lead ST over the OUT lead to the second choice link circuit for any subsequent demand call originating in this particular sub-group, and also extend the IN lead from a preceding link circuit to the next choice link circuit. Contacts CO3 prepare a circuit to operate relay K over lead SK, and contacts CO4 disconnect the original operating path for relay KQ.

The operation of relay MA of the cyclic queue control, at contacts MA1 prepares to short circuit the middle winding of relay MB, at contacts MA2 operates the relays LA and LB, and at contacts MA3 removes the short circuit from its left-hand winding. Contacts MA4 provide an alternative hold path for relay MA on its right-hand winding and contacts MA5 connect battery to common lead M1 in response to which relay K will ultimately operate. Relay CP operating, at contacts CP1 operates relay CB over its lower winding in series with relay CA which holds over its upper winding. Relay CB operating, at contacts CB1 prepares a path to indicate the next queue position, at contacts CB3 prepares a self-hold circuit, and at contacts CB4 prepares another operate path for relay CP. Contacts CB7 disconnect and release relay CP. Relay CP releasing, at contacts CP1 releases relay CA, but holds relay CB operated over its lower winding through contacts CK3, CJ3, CH3, CG3, CF3, CE3, CD3, CC3, and CB3. Relay CA in releasing at contacts CA2 extends earth over contacts MA1 and MB3 to the middle winding of relay MB which is connected to battery in series with the right-hand winding of relay MA. The middle winding of relay MB is, however, short-circuited at this time by earth extended over common lead K1 so that relay MB does not operate.

Relay LA operating, at contacts LA1 and LA4 provides an indication of a call in queue to some of the operators' positions by applying earth to common leads OP1 and OP2 respectively. Contacts LA2 disconnect the original operate path of relay MA, and contacts LA3, 5, 6 and 7, break the operate paths of relays MB, MC, MD and ME, respectively. Relay LB operating, at contacts LB1, LB4, provides an indication of a call in queue to the remainder of the operators positions, by applying earth to common leads OP3 and OP4 respectively, and at contacts LB2, 3, 5, 6 and 7, disconnects the operate paths of relays MF, MG, MH, MJ and MK, respectively.

At this juncture it is convenient to indicate the various relays operated, because as this is a light traffic period no other circuit function takes place until in response to the call waiting indication on operator assigns a demand finder to the call. In the demand relay set, relays LS, B, and KR, are operated, while in the link circuit relays KD, KQ and CO are operated, and the demand hunter is located on the bank contact corresponding to the demand relay set DRS. The queue finder, being on contact two, has extended the demand hunter wipers to the cyclic queue control. In the cyclic queue control relays CB, MA, LA, LB, are operated. It is to be noted that the next position of the queue is indicated by contacts CB1 connecting earth to common lead C2 from contacts CA3.

In response to the call waiting indication on all the operators positions, any operator can assign a demand finder to answer the call by operating a connect key (not shown) which results in its associated demand finder searching for the indication of the calling demand relay set on the demand finder bank multiple FM. The first demand finder to encounter this indication, halts its search and operates the relay K of that demand relay set and also busies it against intrusion by other finders.

Relay K operates from the earth on the demand finder P bank contact, through the winding of relay K, contacts KR3, to lead SK and wiper DH4, contacts CO3, wiper QF3 on contact two of its bank to common lead M1, and contacts MA5, to the resistor R4 (CQC) and battery. Contacts K3 provide an alternative holding path for relay K, and contacts K2 operate relay LO. Relay LO operating, at contacts LO1 connects a further earth to the P lead of the selector multiple SM, at contacts LO2 disconnects the original operate path of relay KR and at contacts LO3 provides an alternative self-hold path, and also releases relay KR. Contacts LO4 disconnect the ring tone from the speech conductors, contacts LO5 disconnect the common lead 11 and contacts LO6 remove the holding battery of relay KD of the link circuit which thus releases. Relay KR releasing, at contacts KR1 disconnects earth from lead K1 extending to the cyclic queue control, and at contacts KR3 disconnects a point in the original operate path of relay K.

When relay KD of the link circuit releases, at contacts KD1, it completes a point in the path to the demand hunter driving magnet DHDM and at contacts KD2 releases relays KQ and CO whose contacts prepare the link circuit for further use on other calls, hence the link circuit restores to the normal condition.

When earth is disconnected by contact KR1 from the common lead K1 the short circuit is removed from the middle winding of relay MB and this relay operates over its middle winding in series with the right-hand winding of relay MA. Relay MB operating at contacts MB3 introduces its high resistance left-hand winding into the holding circuit of relay MA which cannot remain operated to this condition and hence releases. With the release of relay MA contacts MA1 break the series holding circuit for relay MB which also releases. Contacts MA2 release relays LA and LB, and contacts MA3 replace the short circuit on the left-hand winding of relay MA. Upon releasing, relays LA and LB, at their contacts 2, 3, 5, 6 and 7, complete points in paths to relays MA to MK respectively, and at their contacts LA1, LA4, LB1 and LB4 remove the call in queue indication from the common leads OP1 to OP4 respectively of all the operators positions. Any other call requiring operator assistance will encounter the queue indication provided by contacts CA3 and CB1 to the common lead C2.

The supervision of the call is provided by the application of earth to the S lead of the demand finder multiple FM and is effected in the following manner. After a call has been set up between the two subscribers, relays LS, B, K, LO, in the demand relay set are operated. At the end of the call the subscriber disconnects the loop condition applied to the (−) and (+) speech wires and hence relay LS releases. Relay LS releasing, at contacts LS1 releases the slow-to-release relay B and also applies earth through contacts K1 to the S lead of the finder-multiple FM to give the supervision signal to the operator. Relay B releasing, at contacts B1 disconnects one of the holding paths of relay LO, and at contacts B6 makes the guarding of the demand relay set dependent on contacts LO1.

The operator can now disconnect the demand finder associated with the call, and this will result in the release of relay K in the demand relay set. Relay K releasing, at contacts K1 disconnects a point in the supervisory lead, at contacts K2 release relay LO, and at contacts K3 disconnects its original holding battery. Relay LO releasing, at contacts LO1 removes earth from the P lead of the selector multiple SM and thereby makes the demand relay set available for further calls.

The method by which the cyclic queue control directs the calls to queue positions in periods of heavy traffic will now be described. It will be assumed that all the demand finders of every operator are busy and that the relay CB has been operated as already described. The next demand relay set to use the cyclic queue control encounters the queue position indication on common lead C2, which causes the link circuit to respond as described to operate relays MB and CP over common lead K2. Relay MB operating, at contacts MB1 prepares a point in the operate path of relay MC, at contacts MB2 operates relays LA and LB, and at contacts MB3 removes the short circuit from its left-hand winding. Contacts MB4 provide the holding circuit for relay MB, contacts MB5 providing the indication on common lead M2 to halt the demand finder when it is assigned by an operator to the call. Relay CP operating at contacts CP1 operates the relay CC on its lower winding in series with the upper winding of relay CB which holds, through contacts CB5 and CA5.

Relay CC operating, at contacts CC1 prepares a point in a path to common lead C3, at contacts CC3 prepares a self-hold circuit over its lower winding, and at contacts CC4 prepares a path to relay CP from common lead K3. Contacts CC5 prepare a circuit to operate relay CD and contacts CC7 disconnect a path from common lead K2 to relay CP which releases. The release of relay CP, at contacts CP1 releases relay CB, which at contacts CB1 disconnects earth from common lead C2, and at contact CB2 applies earth to the middle winding of relay MC. The latter relay cannot operate because earth on common lead K2 in conjunction with the earth from contact CB2 in effect apply a short circuit to the middle winding. Contacts CB5 complete a further point in the path to relays CC and CD, and contacts CB6 connect the earth to common lead C3 to indicate the next queue position. Relays LA and LB operating, perform in a similar manner to that described previously, both relays remaining operated from contacts MB2.

As all the operators demand finders are still busy when a further demand relay set requires assistance, its associated queue link circuit encounters the indication of the next queue position on common lead C3. This results in the link circuit functioning as described previously and an earth is applied to common lead K3 which operates the relay CP. Relay CP operating, at contacts CP1 operates the relay CD on its lower winding, in series with the upper winding of relay CC which holds, over contacts CC5, CB5, CA5.

Relay CD operating, at contacts CD1 prepares a point in a path to common lead C4, at contacts CD3 prepares to a self-hold circuit over its lower winding, and at contacts CD4 completes a path to relay CP from common lead K4. Contacts CD5 prepare a path to relay CE and contacts CD7 disconnect a point in the path from relay CP to common lead K3, which results in relay CP releasing. Relay CP releasing, at contacts CP1 releases relay CC, which, at contacts CC1, disconnects earth from common lead C3 and at contacts CC2, connects earth to the middle winding of relay MD. The latter does not operate, however, due to being short-circuited by earth from common lead K3 on one side, and earth from contact CC2 on the other. Contacts CC5 complete a further point in the path to relays CD and CE, and contacts CC6 connect earth to common lead C4 to indicate the next queue position.

Assuming all demand finders remain busy further calls requiring operator assistance cause the relays CE, CF, CG, CH, CJ, CK, to function in turn, as calls arrive, in the manner described for relays CB, CC, and CD, each relay providing individual queue positions for calls. When the ninth call arrives for a queue position, relay CK is operated on its lower winding, through contacts CL3, CK3 to earth at contact CP1. This call finds a queue position indicated on lead C10 by earth over contacts CJ6, and CK1. The association of this queue position with the link circuit concerned with this call causes earth to be applied to common lead K10 which operates relay CP. Relay CP operating at contacts CP1 operates relay CL in series with the upper winding of relay CK, which holds. Relay CL operating, at contacts CL1 prepares a circuit from common lead K1 to relay CP, at contacts CL2 releases relay CP, and at contacts CL3 disconnects the lower winding of relay CK. Relay CP releasing, at contacts CP1, releases relays CK and CL and also operates relay CA.

Relay CK releasing, at contacts CK1 removes earth from common lead K10, at contacts CK3 restores a point in the operate path of relay CA, and at contacts CK6 prepares common lead C1 to indicate the 10th position of the queue. Relay CA operating, at contacts CA1 completes a path to common lead C1, at contacts CA2 connects earth to the middle winding of relay MC thereby short-circuiting the middle winding due to earth from common lead K2. Contacts CA4 prepare the operate path for relay CP from common lead K1 and contacts CA5 prepare a series operate path for relay CB and a hold path for relay CA.

When the link circuit associated with the 10th call requiring a queue position encounters the indication on the common lead C1, it causes an earth to be applied to common lead K1, which operates relay CP. Relay CP operating, at contacts CP1 operates relay CB on its lower winding in series with the upper winding of relay CA, which holds. Relay CB operating, at contacts CB4 provides a path to hold relay CP operated from earth on common lead K2, through contacts CB4, and CC7.

Assuming no other calls arrive for queue positions, the ten calls are located in order of arrival awaiting operators to become available to deal with them. The first operator to have a demand finder idle assigns it to search for the demand relay set at the head of the queue, this position being indicated by the battery potential on common lead M2. As explained previously when the relay K of the demand relay set DRS operates, the link circuit associated with the call is released. Hence its queue position is also vacated, this being caused by the link circuit disconnecting earth from common lead K2 and releasing relay CP and also allowing relay MC to operate over its middle winding in series with the right hand winding of relay MB, from earth provided by contacts CA2. Relay CP releasing, at contacts CP1 releases the series hold path of relays CA and CB. Relay CA releases, but relay CB remains held through contacts CB3 and CP1. Relay CA releasing, at contacts CA1 disconnects the indication of the 10th position of the queue, at contacts CA2 disconnects the original operate earth of relay MC, and at contact CA5 restores a point in the path to relays CB, and CC. Contacts CA3 restore the earth to common lead C2 over contacts CB1 to indicate that this is now the vacant position in the queue.

When relay MC operates, contacts MC1 complete the short-circuit of the middle winding of relay MD provided by earth over cantacts CB2. Contacts MC2 provide another earth to hold relays LA and LB operated and contacts MC3 remove the short-circuit from the left-hand winding of relay MC. This winding is of high resistance and its introduction in series with the right-hand winding of relay MB causes the latter relay to release. Contacts MC4 complete the circuit to hold relay MC operated over its right-hand winding from earth on common lead K3, and contacts MC5 complete the path to common lead M3 to indicate that this position is now the head of the queue. Relay MB releasing, at contacts MB1 disconnects a point in the original operate path of relay MC, and at contacts MB3 replaces the short-circuit of the left-hand winding of relay MB. Contacts MB4 break a point in the holding circuit of the right-hand winding of relay MB to the common lead K2, and contacts MB5 disconnect the head of the queue position indication from common lead M2. It is still assumed that no calls have arrived for queue positions and it is to be noted that only relays CB, and MC, LA and LB are operated in the cyclic queue control. When an idle demand finder is assigned by an operator to search for the call at the head of the queue, it encounters the indication provided by the battery on common lead M3 which results in the operation of relay K of the demand relay set in that position. As explained previously the operation of relay K results in the release of the associated link circuit. This causes earth to be removed from common lead K3, and the short-circuit from the relay MD which operates over its middle winding in series with the right-hand winding of relay MC, from earth of contacts CB2.

When relay MD operates, contacts MD1 complete a short-circuit for the middle winding of relay ME. This short-circuit is provided by earth from common lead K4 through contacts MD4, to one side of the middle winding of relay ME, and from earth at contacts CD2, over contacts MD1, ME3, to the other side of the middle winding. Contacts MD2 provide earth to hold relays LA and LB operated and contacts MD3 remove the short-circuit from the left-hand winding of relay MD. This winding is of high resistance and its introduction in series with the right-hand winding if relay MC causes the latter to release. Contacts MD4 complete the circuit to hold relay MD operated on its right-hand winding from the earth on common lead K4, and contacts MD5 complete the path to common lead M4 to indicate that this position is now the head of the queue. Relay MC releasing, at contacts MC1 disconnects a point in the original operate path for relay MD, and at contacts MC3 completes a short-circuit of its left-hand winding. Contacts MC4 break a point in the holding circuit of the right-hand winding of relay MC to the common lead K3, and contacts MC5 disconnect the head of the queue position indication from the common lead M3.

It will be obvious to those skilled in the art that the answering by operators of the remainder of the calls in the queue positions will proceed as detailed in the previous description, until all calls are answered, when the cyclic queue control will restore to normal and the call-inqueue indication to all operators positions will be removed. It is to be noted that although in the case described, the queue started with the relay MB, it could, in fact have started with any of the relays MA to MK. The head of queue position at any instant is indicated by the particular operated relay of the relays MA to MK, the queue being cleared in a cyclic alphabetical order as demand finders become available. Also it is to be noted that the queue position to which the next call is to be directed is always indicated by the particular operated relay of the relays CA to CK.

It may arise that although ten queue positions have been filed, further calls requiring operator assistance may arrive before any of the calls already in queue have been cleared. Calling demand relay sets, after the 10th call is in queue, encounter the queue indication of the 10th position on the relevant C common lead, the demand relay sets and link circuits associated with these calls functioning in the manner described previously. When a demand finder is available to deal with the demand relay sets in the 10th queue position, these are cleared in an order dependent on the location of the demand relay set on the bank multiple of the demand finders.

Thus if more than one demand relay set is in a queue position at any time, the demand relay sets in that position cease to be cleared on a time of arrival basis, but instead they are cleared in an order dependent on their precedence of location in the demand finder bank multiple.

The condition may also arise that the vacant queue position adjoins the remaining occupied position of the queue. Taking for example that the queue position is indicated by the operation of relay CC and its contacts CC1 therefore connect earth to common lead C3 and that relay MB is associated with the last queue position. When it becomes the turn of the last queue position to be cleared, relay MB operates in the manner previously described, contacts MB1 complete the circuit to operate relay MC over its middle winding, but as the earth from common lead K2 is on the other side of the winding it is temporarily short-circuited and does not operate.

When the last queue position is cleared, earth is removed from common lead K2 and thus relay MC operates in series with the relay MB. Relay MC operating at contacts MC1 is prevented from operating relay MD in series with relay MC by the fact that contacts CC2 have removed the operate earth for the middle winding of relay MD. Contacts MC3 introduce the high resistance winding of relay MC into the holding circuit of relays MB and MC. Relay MB releases because its right-hand winding cannot hold to this increased resistance and at contacts MB1 breaks the operate path of relay MC, which also releases. Contacts MC2 release the relays LA and LB and the cyclic queue control is now normal with only relay CC operated to indicate a start of queue position.

What is claimed is:

1. In a telephone system a plurality of trunk demand circuits, a plurality of automatic switches, the trunk demand circuits being multipled over said automatic switches, a plurality of operators' positions having access to said trunk demand circuits over said automatic switches, equipment common to all said trunk demand circuits to form said trunk demand circuits into a queue having a predetermined number of positions, means in said common equipment for extending said trunk demand circuits to said operators' positions in the order in which they stand in the queue, means in said common equipment effective if the number of trunk demand circuits requiring connection to operators' positions is greater than said predetermined number to direct the excess trunk demand circuits to the last position of the queue and means in said common equipment for extending said excess trunk demand circuits to said operators' positions in the order in which said excess trunk demand circuits appear in the multiple of said automatic switches.

2. In a telephone system, a plurality of trunk demand circuits, a plurality of operators' positions having access to said trunk demand circuits, equipment common to all said trunk demand circuits to form said trunk demand circuits into a queue having a predetermined number of positions, stepping means in said common equipment responsive each time a trunk demand circuit joins the queue to make one step to mark the next position in the queue, means in said common equipment for extending said trunk demand circuits to said operators' positions in the order in which they stand in the queue, means for preventing the further operation of said stepping means when the last queue position is marked whereby trunk demand circuits subsequently taken into use are directed to the last queue position and means for extending the trunk demand circuits standing in the last queue position to said operators' positions in an order other than the order in which they joined the last queue position.

3. In a telephone system, a plurality of trunk demand circuits, a plurality of operators' positions having access to said trunk demand circuits, equipment common to all said trunk demand circuits to form said trunk demand circuits into a queue having a predetermined number of positions, first cyclically-operated stepping means in said common equipment responsive each time a trunk demand circuit joins the queue to make one step to mark the next position in the queue, means for preventing the further operation of said first cyclically-operated stepping means when the last queue position is marked whereby trunk demand circuits subsequently taken into use are directed to the last queue position, second cyclically-operated stepping means in said common equipment responsive each time a trunk demand circuit is taken out of the queue to make one step to mark the trunk demand circuit at the head of the queue and means for preventing the stepping of said second cyclically-operated stepping device from a queue position occupied by more than one trunk demand circuit until all such trunk demand circuits have been extended to operators' positions.

4. In a telephone system, a plurality of trunk demand circuits, a plurality of operators' positions having access to said trunk demand circuits, equipment common to all said trunk demand circuits to form said trunk demand circuits into a queue having a predetermined number of positions, cyclically-operated stepping means in said common equipment responsive each time a trunk demand circuit joins the queue to make one step to mark the next position in the queue and means for preventing the further operation of said stepping means when the last queue position is marked whereby trunk demand circuits subsequently taken into use are directed to the last queue position, the cyclic operation of said stepping means ensuring that the head of queue positions vacated as the trunk demand circuits are extended to the operators' positions each becomes successively the last position in the queue.

5. A telephone system as claimed in claim 4 and comprising in addition a finder switch included in each operator's position, the trunk demand circuits being multipled over all the finder switches, second cyclically-operated stepping means in said common equipment responsive each time a trunk demand circuit is taken out of the queue to make one step to mark in the finder switch multiple the trunk demand circuit at the head of the queue whereby said trunk demand circuits are extended to the operators' positions in the order in which they stand in the queue, means responsive to the presence of a plurality of trunk demand circuits in one queue position for preventing the stepping of said second cyclically-operated stepping means and for causing said second cyclically-operated stepping means simultaneously to mark in the finder switch multiple the plurality of trunk demand circuits in said one queue position whereby said plurality of trunk demand circuits in said one queue position are extended to the operators' positions in the order in which they appear in the finder switch multiple.

6. A telephone system as claimed in claim 5 and comprising in addition a switching device for driving said cyclically-operated stepping means, means for operating and releasing said switching device each time a trunk demand circuit joins the queue and means for maintaining said switching device operated when said cyclically-operated stepping means marks the last position in the queue.

7. In a telephone system, a plurality of groups of trunk demand circuits, a plurality of operators' positions, a finder switch included in each operator's position, the trunk demand circuits being multipled over all the finder switches, a plurality of control apparatus provided in common to each group of trunk demand circuits, equipment provided in common to all said groups of trunk demand circuits to form said trunk demand circuits into a queue having a predetermined number of positions, an automatic switch in each of said control apparatus, means responsive to the taking into use of one trunk demand circuit of one of said groups for connecting thereto one of said plurality of control apparatus common to said one of the groups of trunk demand circuits, means in said common equipment responsive to the connection between said one trunk demand circuit and said one control apparatus for setting the automatic switch in said one control apparatus to a position corresponding to the position of said one trunk demand circuit in the queue, stepping means in said common equipment responsive each time a trunk demand circuit is taken out of queue to extend markings successively to the finder switch multiple over the automatic switches in the control apparatus which are to be connected to trunk demand circuits whereby the trunk demand circuits are extended over said finder switches to operators' positions in the order in which the trunk demand circuits stand in the queue and means responsive when the number of trunk demand circuits requiring connection to operators' positions is in excess of said predetermined number for setting the automatic switches of the control apparatus connected to the excess trunk demand circuits to positions corresponding to the last position of the queue whereby when all trunk demand circuits except those in the last position of the queue have been removed from the queue said stepping means extend markings simultaneously to the finder switch multiple to enable said excess trunk demand circuits to be extended to operators' positions in accordance with their position in the finder switch multiple.

8. A telephone system as claimed in claim 7 and including second stepping means provided in said common equipment responsive to advance one step each time a trunk demand circuit is taken into use to apply a marking to the automatic switches in the other control apparatus whereby the automatic switches are set to a position indicative of the queue position of the trunk demand circuit next to be taken into use.

9. A telephone system as claimed in claim 8 wherein said stepping means are cyclically operated.

References Cited in the file of this patent

UNITED STATES PATENTS

| | | |
|---|---|---|
| 2,598,098 | Balzer | May 27, 1952 |
| 2,686,843 | Shafer | Aug. 17, 1954 |
| 2,704,788 | Wicks | Mar. 22, 1955 |